April 16, 1957 P. SPENCE 2,788,895
GRAVEL PROCESSING MEANS
Filed March 7, 1952
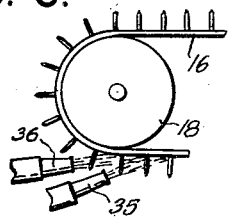
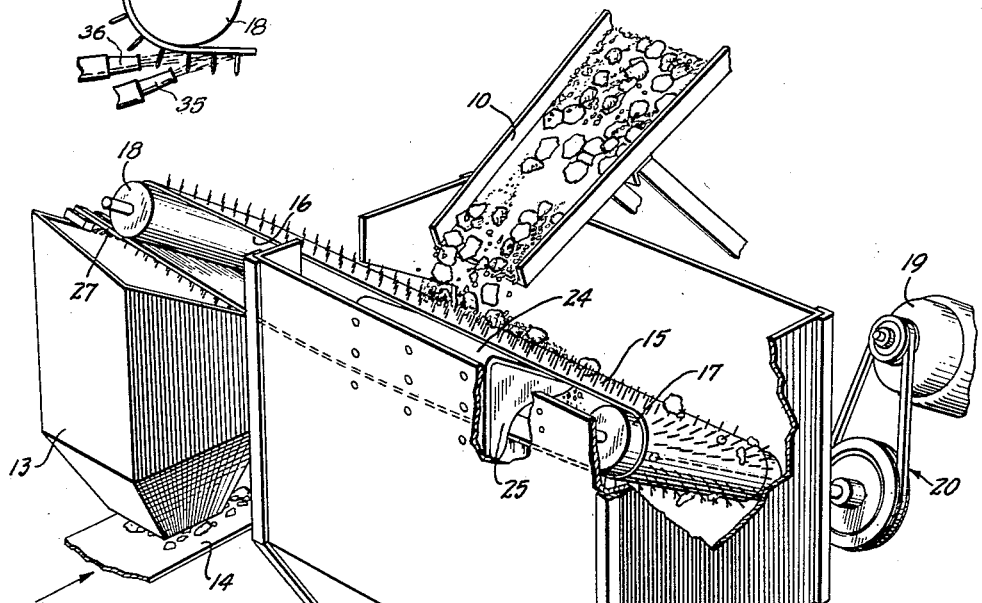
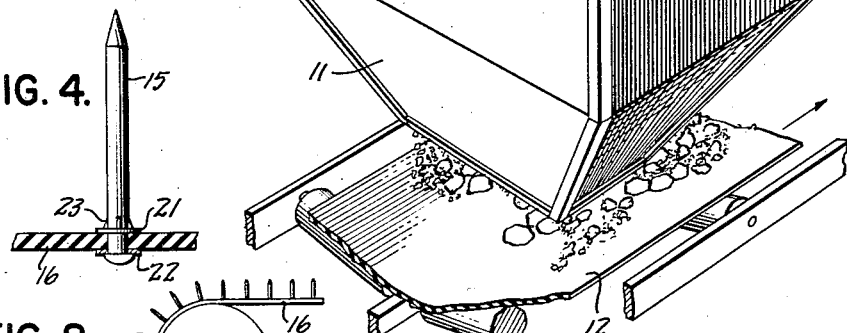
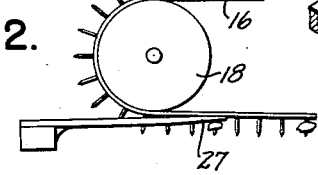
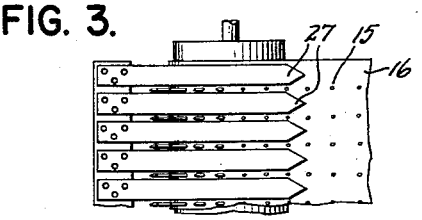
INVENTOR.
PAULSEN SPENCE
BY
ATTORNEYS

United States Patent Office 2,788,895
Patented Apr. 16, 1957

2,788,895

GRAVEL PROCESSING MEANS

Paulsen Spence, Baton Rouge, La.

Application March 7, 1952, Serial No. 275,276

11 Claims. (Cl. 209—109)

My invention relates to means for the substantial extraction of mud or clay from a gravel mixture that may be contaminated with mud or clay.

In dredging river bottoms and the like for gravel, the quality of product is impaired by substantial contamination due to lumps of mud or clay, known as mud balls or clay balls. These balls are ordinarily of a hardness which will not permit their removal or disintegration by impact or by washing. They thus remain after normal sieving and other sorting processes, and removal by hand has been about the only truly effective means of eliminating this source of contamination; but this is, of course, a cumbersome and costly process.

It is an object to provide an improved means for removing a substantial part of the mud or clay component from gravel thus contaminated.

It is a specific object to meet the above object with an entirely automatic device operating continuously and in series with other automatic continuous processes at a gravel refinery.

Other objects and various further features of novelty and invention will be pointed out or will become apparent to those skilled in the art from a reading of the following specification, in conjunction with the accompanying drawings. In said drawings, which show, for illustrative purposes only, preferred forms of the invention:

Fig. 1 is a simplified perspective view partly broken away and illustrating features of the invention;

Fig. 2 is a simplified fragmentary side view of elements at one end of the device of Fig. 1;

Fig. 3 is a bottom view of the elements of Fig. 2;

Fig. 4 is an enlarged fragmentary view of the belt construction of Fig. 1, with parts being shown in section;

Fig. 5 is an enlarged fragmentary view illustrating an alternative for the embodiment of Figs. 2 and 3; and Fig. 6 is a view similar to Fig. 2 but illustrating a modification.

Briefly stated, my invention contemplates employment of a continuously rotating endless impaling means characterized by a plurality of upstanding studs or spikes on the outer surface thereof. Means are provided for the continuous discharge of the unsorted or contaminated gravel mixture generally normal to the impaling means, so that mud or clay balls may be impaled to the exclusion of the gravel component of the mixture. The impaling means may comprise a large cylindrical drum on an inclined axis, but in the present form I employ an endless belt between horizontally spaced pulleys. Means are provided for the discharge of all unimpaled material, representing substantially purified gravel, prior to de-impaling and discharging the mud or clay balls. Two alternative constructions will be described to illustrate the de-impaling means.

Referring to Fig. 1 of the drawings, my invention is shown in application to a continuous-flow device for refining a gravel mixture, which may be contaminated with mud or clay, as introduced by means of a chute 10. The refined gravel may be collected by hopper means 11 and passed off continuously by means of a conveyor belt 12. Extracted mud or clay may be collected by hopper means 13 and separately passed off by a conveyor belt 14.

In accordance with the invention, I employ continuously rotating means characterized by a large exposed surface area having impaling means presented to the products discharged from chute 10. This exposed surface may be studded with a relatively large plurality of impaling spikes 15, extending generally normal to such outer surface and spaced appropriate to the predominant size of mud or clay ball to be extracted. The studs or spikes 15 are preferably aligned in a plurality of parallel rows, for a purpose to be described. In the form shown, the rotating means comprises an endless flexible belt 16, stretched between laterally-spaced pulley 17—18, and motor means 19 may drive the pulley or drum 17 through suitable reduction-coupling means 20. In Fig. 4, I show that the studs 15 may be simply held on the belt 16 by means of washers 21—22, compressed against the belt and held in place by suitably staking or crimping the shank surface of the spike 15, as schematically indicated at 23.

In order to support the upper span of the belt 16 at the location of receiving the discharge from chute 10, I provide a table plate 24, suitably supported by the hopper 11 and braced by bracket means 25.

It will be appreciated that upon discharge of the contaminated product from chute 10 onto belt 16, a substantial fraction of the mud or clay-ball component of the mixture will be impaled on the spikes 15. The unimpaled material represents the refined mixture and may be merely dropped off as the belt rounds the first pulley, say, the pulley 17; but, in the form shown, I remove the substantial fraction of the refined product by orienting the pulley axes (and, therefore, the belt 16) at a substantial inclination below the horizontal, as shown. Any of the refined product that is not discharged by rolling off the belt before the belt reaches the first pulley 17 will be dropped as the belt rounds such first pulley; I, therefore, prefer that the hopper 11 embrace the belt 16 not only at the location of receiving discharge from chute 10 but also beyond this first pulley 17, all as shown in Fig. 1.

In accordance with the invention, I also provide novel means for de-impaling the mud or clay-ball component of the mixture, and I perform this operation at a location remote from the point of discharge from chute 10. As shown in Fig. 1, this operation is performed near the other pulley 18. In Figs. 2 and 3, it will be seen that the spikes 15 may be cleaned of impaled mud or clay balls by means of a comb including teeth 27 of width preferably substantially equal to the spacing between rows of spikes 15 and continuously riding the lower span of the belt 16. The impaled mud or clay balls will be forced off the spikes 15 as the belt rounds the second pulley 18.

In Fig. 5, I show an alternate construction for deimpaling mud or clay balls. In this construction, plate means 30 of width preferably substantially the longitudinal spacing between adjacent spikes 15, is laid for substantially the transverse width of the belt 16. Plate means 30 may be supported by the belt 16 for guided displacement upwardly or outwardly of the outer surface of the belt, and to this end I provide means such as studs 31, fixed to plate 30 and extending through the belt 16, for normal projection inwardly of the belt. A relatively weak coil spring 32 may act between the inner surface of the belt 16 and a shoulder or head 33 on the stud 31 to urge the plate means 30 toward a seated position on the outer surface of the belt 16. It will be clear that upon approach to one of the pulleys, the head 33 may be intercepted by the surface of the pulley, so that plate means 30 will be projected upwardly, as to a position shown at 30', for complete removal of the impaled material. For the general arrangement shown in Fig. 1, and with the employment of a belt construction as illustrated in Fig. 5, the belt is preferably driven in the opposite direction (counterclockwise) to that described above. In such case, de-impaling will still take place over the mud or clay-ball hopper 13. In certain cases, it may be desired to employ an additional inner belt 34 inside the belt 16, for the purpose of commencing to lift the heads 33 before they would otherwise be intercepted by the surface of pulley 18, as will be understood.

It will be appreciated that I have described relatively simple means for extracting a substantial fraction of the mud or clay component in a gravel mixture thus contaminated. If a first stage of extraction does not produce a sufficiently refined product, then, of course, a second stage may be employed without destroying the basic usefulness of the device in a continuous-flow gravel refinery. When a high-pressure supply of water or other fluid is available, it may be desirable to provide high-speed jets directed at the belt 16 at an appropriate location in order to clean the belt before it receives the unrefined charge; in Fig. 6, I illustrate such use of jets 35—36 to provide an alternative means for removing impaled mud balls, by inclining the jets to near-tangent incidence with the underside of the belt, near the location of hopper 13.

While the invention has been described in detail in application to certain preferred forms, it will be understood that modifications will be made within the scope of the invention as defined in the accompanying claims.

I claim:

1. In a device of the character indicated for extracting mud or clay from a mixture thereof with gravel, an elongated endless substantially flat belt including a plurality of impaling studs projecting upwardly from the outer surface of said belt, the mixture-discharging means directed generally at an upper part of the outer surface of said belt, supporting means for said belt and including laterally spaced pulleys on axes inclined to the horizontal, whereby, upon discharge of such mixture generally normal to and directed downwardly at the upper span of said belt, mud or clay balls will be impaled to the exclusion of the gravel component of such mixture, so that unimpaled material may freely drop off the inclined surface of said belt, and deimpaling means cooperating with said belt to remove impaled mud or clay at a location spaced from the location of said discharging means.

2. A device according to claim 1, in which said discharging means is located generally above the upper span of said belt and is directed to discharge such mixture between said pulleys and generally normal to the upper span of said belt.

3. A device according to claim 1, and including table means in supporting relation underneath said belt at the location of said discharging means.

4. A device according to claim 1, in which said impaling studs are aligned in a plurality of substantially parallel rows around said belt, and in which said de-impaling means includes a substantially flat-toothed comb engaging said belt between adjacent rows of impaling studs.

5. A device according to claim 1, in which said de-impaling means includes plate means between adjacent studs and supported by said belt for guided displacement outwardly of the outer surface of said belt, and actuating means for said plate means including a stud projecting inwardly of the inner surface of said belt for actuation upon approach to one of said pulleys.

6. A device according to claim 1, in which said de-impaling means includes a high-pressure fluid jet directed at said outer surface and substantially away from a normal to said outer surface.

7. A device according to claim 5, and including a second belt over said pulleys and inside said first belt, whereby said second belt may assist in the projection of said plate studs upon approach to one of said pulleys.

8. A device according to claim 5, and including spring means urging said plate means into seated relation on the outer surface of said belt.

9. In a device of the character indicated for extracting mud or clay from a mixture thereof with gravel, rotating impaling means including an enlarged periphery with a plurality of outwardly projecting impaling studs on the outer surface thereof, said rotating means including a rotary axis inclined from the horizontal, means for discharging a mixture of gravel contaminated with mud or clay from above and substantially at the upwardly exposed inclined surface of said impaling means, means for continuously rotating said impaling means, whereby unimpaled material may be discharged by dropping substantially to one side of said impaling means, and deimpaling means cooperating with said impaling means on the other side thereof to remove impaled mud or clay at a location removed from the location at which unimpaled material is discharged.

10. In a device of the character indicated for extracting mud or clay from a mixture thereof with gravel, an elongated endless substantially flat belt including a plurality of impaling studs projecting upwardly from the outer surface of said belt, drive means for said belt including a pair of generally horizontally spaced pulleys on fixed generally parallel axes inclined from the horizontal, mixture-discharging means above said belt and aligned to discharge mixture at the upper stretch of said belt and between said pulleys, a gravel-collection hopper beneath said belt at the location of mixture discharge and extending toward one of said pulleys but short of the other of said pulleys, and deimpaling means cooperating with said belt and between rows of said studs near said other pulley.

11. In a device of the character indicated for extracting mud or clay from a mixture thereof with gravel, an elongated endless substantially flat belt including a plurality of impaling studs projecting upwardly from the outer surface of said belt, supporting means for said belt and including generally horizontally spaced pulleys, means continuously driving said belt via one of said pulleys in one direction, mixture-discharging means directed generally at an upper part of the outer surface of said belt, whereby, upon discharge of such mixture generally normal to and directed downwardly at said part of said belt, mud or clay balls will be impaled to the exclusion of the gravel component of such mixture, so that unimpaled material may freely drop off said belt as it rounds the first pulley after receiving a discharge, first collecting means beneath said first pulley for collecting unimpaled material, deimpaling means cooperating with said belt at a location spaced from said first pulley, and second collecting means associated with said deimpaling means for collecting impaled material to the exclusion of unimpaled material.

References Cited in the file of this patent

UNITED STATES PATENTS

| | | |
|---|---|---|
| 604,822 | De Weese | May 31, 1898 |
| 653,332 | Aspinwall | July 10, 1900 |
| 782,772 | Bivert | Feb. 14, 1905 |
| 790,171 | Bechtel | May 16, 1905 |
| 1,235,027 | Harrison | July 31, 1917 |
| 1,247,736 | Stockard | Nov. 27, 1917 |
| 1,402,251 | Raymond | Jan. 3, 1922 |
| 1,964,637 | Hurxthal | June 26, 1934 |
| 1,979,758 | Merritt | Nov. 6, 1934 |
| 2,189,678 | Rodriguez | Feb. 6, 1940 |
| 2,246,851 | Jordan | June 24, 1941 |
| 2,406,311 | Ashlock | Aug. 27, 1946 |